United States Patent [19]

Kwong et al.

[11] Patent Number: 5,101,572
[45] Date of Patent: Apr. 7, 1992

[54] DISPLACEMENT FOLLOWING ARRANGEMENT AND MEASURING DEVICE INCLUDING SUCH ARRANGEMENT

[76] Inventors: Kam H. Kwong; Kam C. Kwong, both of Rooms 27 & 28, 7th Floor, Block A, Hoi Luen Industrial Centre, 55 Hoi Yuen Road, Kwun Tong, Kowloon, Hong Kong

[21] Appl. No.: 623,221

[22] Filed: Dec. 5, 1990

[30] Foreign Application Priority Data

Feb. 16, 1990 [GB] United Kingdom ............... 9003588

[51] Int. Cl.⁵ .............................................. G01B 7/02
[52] U.S. Cl. ........................................ 33/558; 33/559; 33/503
[58] Field of Search ................ 33/556, 558, 559, 561, 33/503, 1 M

[56] References Cited

U.S. PATENT DOCUMENTS 4,130,941  12/1978  Amsbury ........................ 33/558
4,621,434  11/1986  Hisschmann .................. 33/558

Primary Examiner—Harry N. Haroian
Attorney, Agent, or Firm—Browning, Bushman, Anderson & Brookhart

[57] ABSTRACT

A displacement following device comprises a slider (1) mounted on a slideway (2) for movement along a linear displacement path. A beam (4) mounted on the slider (1) is rotatable about an axis of rotation (5) at its midpoint. A pair of stops (6, 7) spaced apart along the displacement path are fixed to the slideway (2) on opposite sides of the beam (4) and project into the path of movement of the beam. A tension spring (8) has one end connected (at 10) to the slider (1) and its other end connected to a point (9) between the axis of rotation (5) and one end of the beam. The spring (8) biases the beam (4) about its axis of rotation (5) into engagement with the stops (6, 7) so as to bias the slider (1) relative to the slideway (2) into a datum position from which the slider is bidirectionally displaceable along the displacement path. A displacement measuring device can be formed by providing sensing means to sense the displacement of the slider away from the datum position and deliver a measurement signal significant of the magnitude of such displacement.

12 Claims, 3 Drawing Sheets

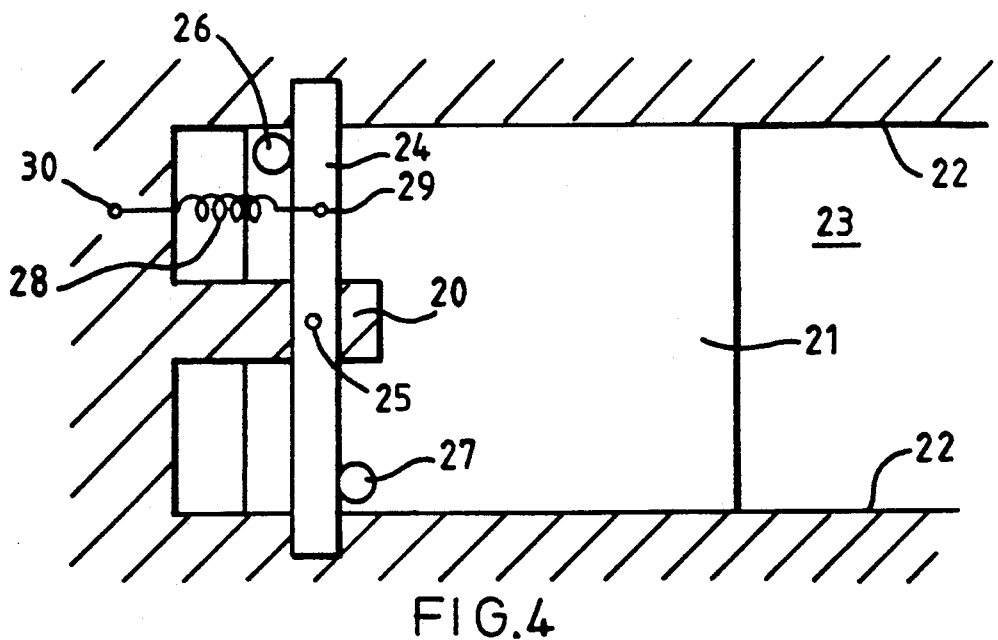
FIG.4
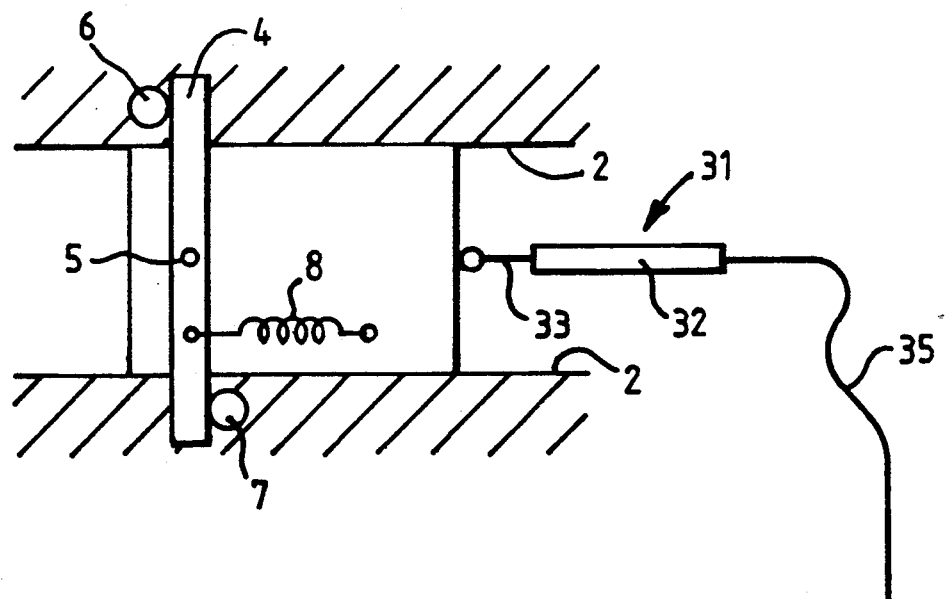
FIG.5
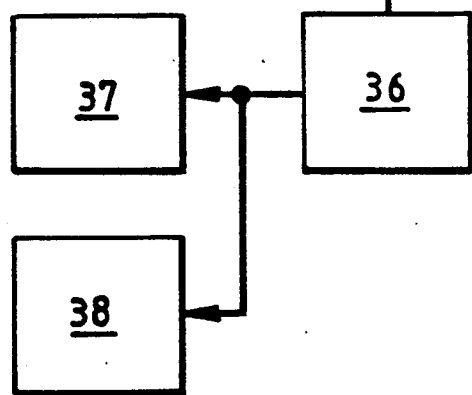

DISPLACEMENT FOLLOWING ARRANGEMENT AND MEASURING DEVICE INCLUDING SUCH ARRANGEMENT

FIELD OF THE INVENTION

The present invention relates to a displacement following arrangement which finds particular but not exclusive application as a displacement measuring device in a tracing head for a numerically controlled machine tool.

BRIEF DESCRIPTION OF THE INVENTION

According to the invention, in one aspect thereof, there is provided a displacement following arrangement comprising:
 first and second members, the first member having a datum position relative to the second member;
 a displacement path along which the first member is guided for movement by the second member;
 a positioning member having two ends and two opposite sides and mounted on one of the first and second members for rotation in a path about an axis of rotation intermediate the ends of the positioning member;
 a pair of stops mounted on the other of the first and second members and extending into the path of rotation of the positioning member on the opposite sides of the positioning member; and
 resilient means adapted to bias the positioning member about its axis of rotation into engagement with the stops so as to bias the first member into the datum position from which the first member is bidirectionally displaceable along the displacement path against the action of said resilient means.

Preferably, the displacement path is linear.

Conveniently, the stops are spaced apart along the displacement path.

Advantageously, the positioning member comprises a beam and the axis of rotation of the beam is substantially at the mid-point of the beam.

In one embodiment, the resilient means comprises a tension spring connected between the said one of the first and second members and a point on the positioning member between the axis of rotation and one said end of the positioning member.

In another aspect, the invention provides a displacement measuring device comprising a displacement following arrangement in accordance with the invention in combination with means for sensing displacement of the first member relative to the second member and for providing a measurement signal corresponding to the displacement of the first member from the datum position.

Preferably, the sensing means comprises an electromechanical transducer for providing an electrical measurement signal corresponding to the displacement of the first member from the datum position.

In a further aspect, the invention provides a displacement measuring apparatus comprising first and second displacement measuring devices in accordance with the invention, the displacement paths of the first and second displacement measuring devices being non-parallel and the second member of the second device being fixed to the first member of the first device.

Conveniently, the displacement paths of the first and second displacement measuring devices are linear.

Advantageously, the displacement paths of the first and second displacement measuring devices are perpendicular to each other.

In a preferred embodiment, the apparatus comprises a third displacement measuring device in accordance with the invention, the displacement measuring devices being mutually perpendicular and the second member of the third device being fixed to the first member of the second device.

Displacement measuring apparatus embodying the invention finds particular application in an object tracing system which further comprises a table, a shank and a stylus, the second member of the first displacement measuring device being attached to the shank and the first member of the third displacement measuring device having attached thereto the stylus for contacting an object to be traced, which is mounted on the table of the tracing system, and for following the contours of the object upon relative movement of the shank and table.

BRIEF DESCRIPTION OF DRAWINGS

In order that the invention may be more readily understood, embodiments thereof will now be described, by way of example, with reference to the accompanying drawings, in which:

FIG. 4 is a diagrammatic illustration of a second displacement following arrangement embodying the invention, the slider of the arrangement being shown in its datum position;

FIG. 5 diagrammatically illustrates a displacement measuring device based on the displacement following arrangement shown in FIG. 1;

DETAILED DESCRIPTION PREFERRED EMBODIMENTS

Figure 1:
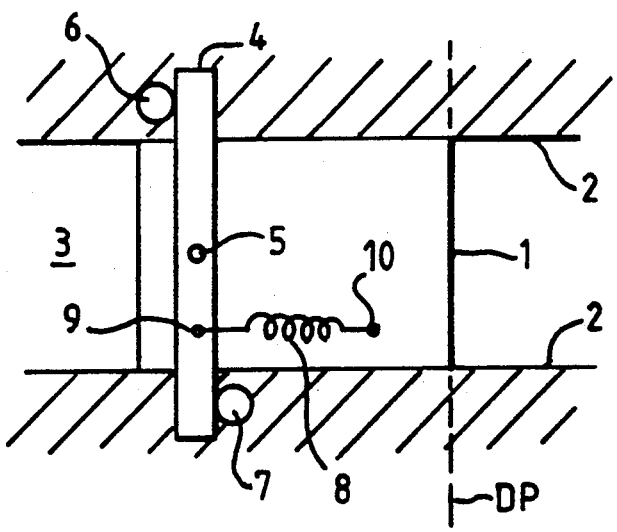
FIG. 1 is a diagrammatic illustration of one displacement following arrangement embodying the invention, a slider of the arrangement being shown in a datum position.

Referring firstly to FIG. 1, one displacement following arrangement embodying the present invention comprises a saddle or slider 1 mounted on a slideway 2 for bi-directional movement along a linear displacement path defined by a channel 3 of the slideway.

A beam 4 is pivotally mounted at its midpoint on the slider 1 by a pivot 5 defining an axis of rotation which is perpendicular to the length of the beam and to the displacement path. First and second stops 6 and 7 projecting into the path of movement of the beam 4 are fixedly mounted on the slideway 2 on opposite sides of the channel 3. The stops 6 and 7 are spaced apart along the displacement paths and the beam is located between the stops, so that the stops are on opposite sides of the beam. A tension spring 8 has one end attached to the beam 4 at a point 9 between the pivot 5 and the end of the beam adapted to cooperate with the stop 7. The other end of the spring 8 is fixed to the slider 1 at a point 10, so that the spring acts to apply a moment to the beam 4 about the pivot 5 so as to bias the beam in an anticlockwise direction about the pivot 5, as seen in the drawings. In the absence of the application of any external force to the slider 1, the spring 8 biases the slider 1 into a datum position (indicated by the line DP) in which end portions of the beam 4 engage the respective stops 6 and 7, the beam lies perpendicular to the displacement path and the line joining the points 9 and 10 is parallel to the displacement path, as shown in FIG. 1 of the drawings.

Figure 2:
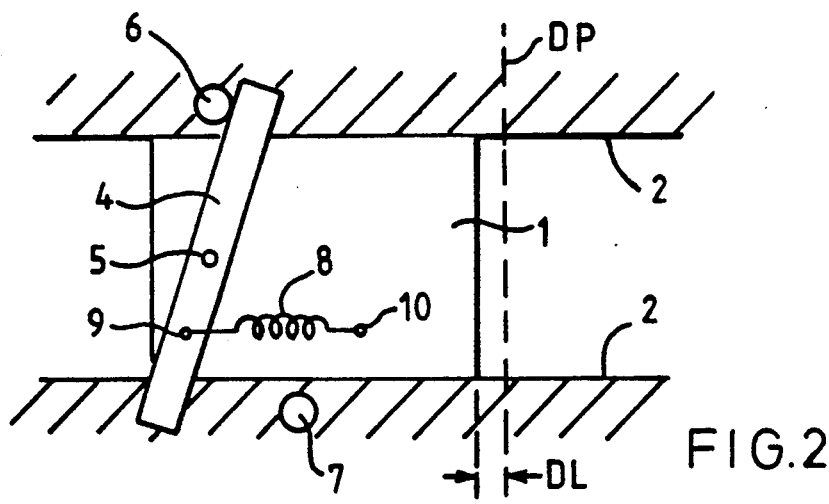
FIG. 2 illustrates the displacement of the slider of the FIG. 1 arrangement away from the datum position in one direction under the influence of an applied force.

FIG. 2 shows what happens if the slider is displaced a distance DL to the left of the datum position DP by the application of an external force. As shown in FIG. 2, the result of this displacement is that the beam 4 remains engaged with the stop 6, as long as the displacement DP remains within a predetermined range of movement, but rotates in a clockwise direction about the pivot 5 against the action of the spring 8, thereby increasing the tension in spring 8 and causing the beam 4 to become disengaged from the stop 7. Upon removal of the external force, the beam rotates anti-clockwise about the pivot 5 under the influence of the moment applied by the spring 8 thereby driving the slider 1 to the right until the beam 4 again comes into contact with the stop 8, thereby returning the slider 1 to its datum position.

Figure 3:
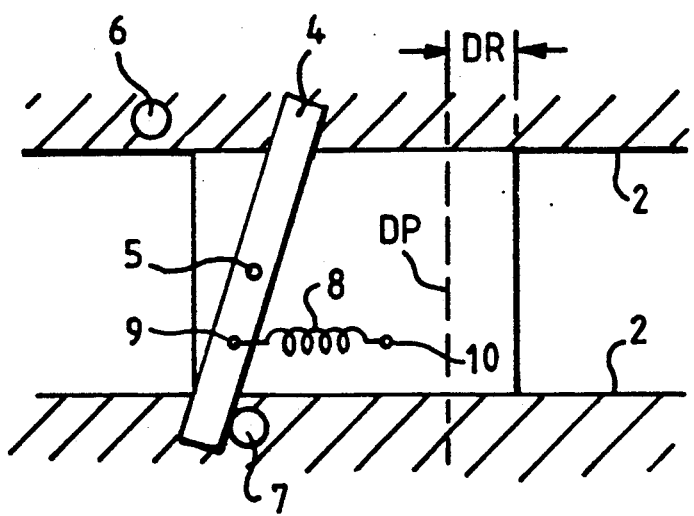
FIG. 3 shows the displacement of the slider of the FIG. 1 embodiment away from the datum position in the opposite direction under the influence of an applied force.

FIG. 3 of the drawing shows the application of an external force to the slider 1 in the opposite direction, resulting the slider 1 being displaced by an amount DR to the right of the datum position DP. During movement of slider 1 to the displaced position shown in FIG. 3 from the datum position shown in FIG. 1, the beam 4 retains its contact with the stop 7 as a result of the action of the spring 8, but rotates in a clockwise direction about the pivot 5 so as to increase the tension in spring 8 and to become disengaged from the stop 6. Upon removal of the external force causing the displacement DR of the slider 1, the beam 4 rotates in the anti-clockwise direction under the action of the moment applied by the spring 8, thereby moving the slider 1 to the left until the beam 4 once more comes into engagement with the stop 6 and holds the slider 1 in its datum position.

Another displacement following arrangement embodying the invention is illustrated in FIG. 4 and comprises a slider 21 mounted on a slideway 22 for bi-directional movement along a linear displacement path defined by a channel 23. A beam 24 is pivotally mounted by a pivot 24 on a salient portion 20 of the slideway 22 which projects along the channel 23 from one end thereof above the slider 1. The slider 1 is formed with stops 26 and 27 which project from the slider 21 into the path of rotation of respective end portions of the beam 24. The two stops 26 and 27 disposed on opposite sides of the slideway portion 20 and are spaced apart along the direction of the displacement path so as to lie on opposite sides of the beam 24. A tension spring 28 has one end fixed to the beam 24 at a point 29 between the pivot 25 and the end of the beam cooperating with the stop 26 and its other end attached to a point 30 on the slideway 22.

The spring 28 applies in an anti-clockwise moment to the beam 24 about the pivot 25, so as to bias the slider 21 into the neutral position shown in FIG. 4, in which the beam 24 engages both of the stops 26 and 27 and lies perpendicular to the displacement path.

Upon application of an external force to the slider 21 such as to cause displacement of the slider to the left, the beam 24 is rotated in the clockwise direction by the stop 27, thereby increasing the tension in the spring 28 and causing the beam 24 to become disengaged from the stop 26. Removal of the force causing the displacement allows the spring 28 to rotate the beam 24 in the anti-clockwise direction about the pivot 25 and, as a result of the continued engagement of the beam with the stop 27, displaces the slider 21 towards the right in FIG. 4. This displacement of the slider 21 under the action of the spring 28 continues until the beam again comes into contact with the stop 26, at which point the slider has been restored to the datum position. Displacement of the slider 21 to the right of the datum position shown in FIG. 4 similarly causes the beam 24 to rotate in the clockwise direction about the pivot 25 as a result of the displacement of the stop 26 with the slider 21, thereby tensioning the spring 28 and disengaging the beam from the other stop 27. Once the slider 21 is released from the displacing force, the spring 28 acts to rotate the beam 24 in the anti-clockwise direction, driving the stop 26 and therefore the slider 21 towards the left until the beam 24 again comes to rest against the stop 27 with the slider 21 in its datum position.

FIG. 5 illustrates a displacement measuring device incorporating the displacement following arranngement of FIG. 1. Such a measuring device could, of course, equally be based on the displacement following arrangement shown in FIG. 4 or on any other form of displacement following arrangement embdoying the invention.

As shown in FIG. 5, the illustrated measuring device includes, in additon to the displacement following arrangement of FIG. 1, a linear transducer 31 for converting the displacement of the slider 1 into a corresponding electrical signal. The transducer 31 comprises a body 32 which is fixedly mounted relative to the slideway 2 and has a spring-loaded probe 33 which extends parallel to the path of movement and which is partially extended from the body 32 into engagement with the slider 1 when the slider is in its datum position. Displacement of the slider 1 to the right thus causes the probe 33 to be retracted into the body 32 from its datum position and movement of the slider 1 to the left causes the probe tp project further from the body 32. The transducer 31 produces an electrical signal which is dependent upon the relative positions of the probe 33 and body 32, so that displacement of the slider 1 from its datum position cuases the output signal of the transducer 31 to change from the normal signal produced with the slider 1 in its datum position, the change being significant of the magnitude and direction of the displacement undergone by the slider 1.

Whilst any suitable electro-mechanical transducer can be used as the transducer 31, one suitable transducer is an LVDT type linear type transducer which is energised by a sine wave signal of predetermined amplitude and produces an output signal in the form of a sine wave having an amplitude which is proportional to the magnitude of the energizing signal and the position of the probe 33 in the body 32.

The transducer 31 is connected by a cable 35 to an electronic processing unit 36 which delivers the required energizing signal to the transducer and normalises the output signal of the transducer before converting the signal into a DC signal which is significant of the displacement of the slider 1. This DC output signal can be fed to a suitable calibrated simple voltmeter giving a direct read-out of the displacement of the slider 1. The output signal may also be supplied to a microprossor 38 adapted to use this output signal in carrying out some control function in dependence upon the measured displacement.

Figure 6:
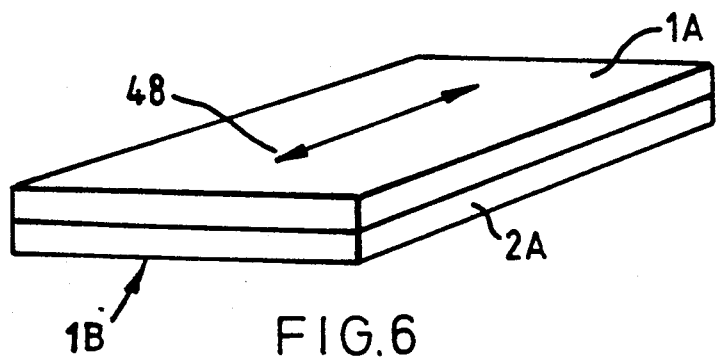
FIG. 6 shows a simplified diagrammatic representation of a displacement measuring device embodying the present invention.

The displacement measuring device of FIG. 5 for measuring displacement along a first linear path is represented diagrammatically in FIG. 6, where the slider 1 and slideway 2 are represented as superimposed rectangular boxes 1A and 2A. The double-headed arrow 48 indicated the direction of the linear displacement path along which the slider 1 is movable.

Figure 7:
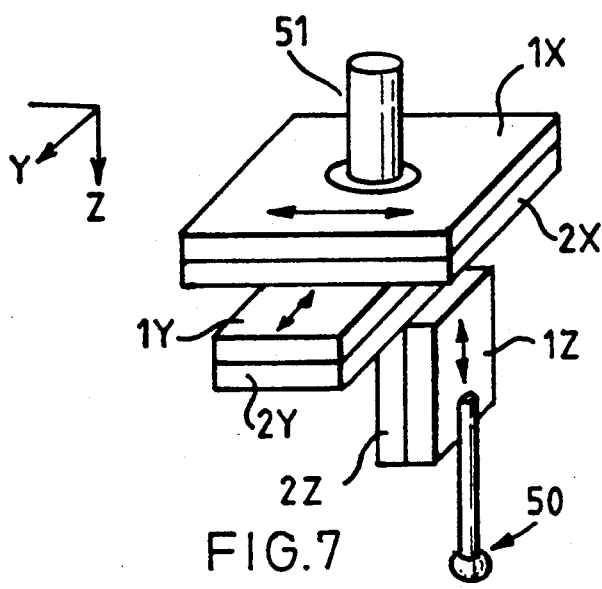
FIG. 7 illustrates, using the diagrammatic representation of FIG. 6, how three displacement measuring devices embodying the invention can be combined to form an assembly for following displacements in three dimensions.

FIG. 7 shows how three displacement measuring devices of the kind represented in FIG. 6 can be combined in order to construct a displacement in three dimensions. Each of the three measuring devices is represented in the manner shown in FIG. 6, the slider and slideway of each device being given the respective reference numerals 1 and 2 with the addition of the suffix "X", "Y" or "Z" indicating the associated axis of an X, Y, Z coordinate system of three mutually perpendicular axes.

A first displacement measuring device comprises a slider 1Z mounted on a slideway 2Z and carrying a stylus 50 which is fixed to the slider 1Z for movement therewith. The slideway 2Z is connected to the slideway 2Y of a second displacement measuring apparatus having a slider 1Y mounted on the slideway 2Y. The slider 1Y is attached to the slideway 2X of a third displacement measuring device having a slider 1X attached to a shank 51. If the shank 51 is held in a fixed postion, the stylus 50 is free to move in three directions under the influence of an applied external force, so as to produce three corresponding electrical output signals each significant of the displacement of the stylus along a respective one of the three axes as a result of relative movement between the slider 1 and slideway 2 of each displacement measuring device. The resulting measuring apparatus is illiustrated diagrammatically in FIG. 8, where the stylus 50 and shank 51 are shown projecting from a rectangular box representing a housing containing the three displacement measuring devices.

Figure 8:
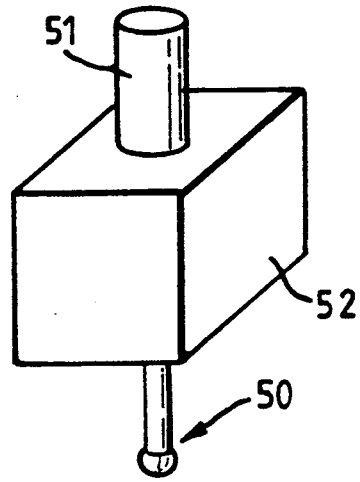
FIG. 8 diagrammatically represents a tracing head containing within its housing the assembly of three displacement measuring devices illustrated in FIG. 7.
Figure 9:
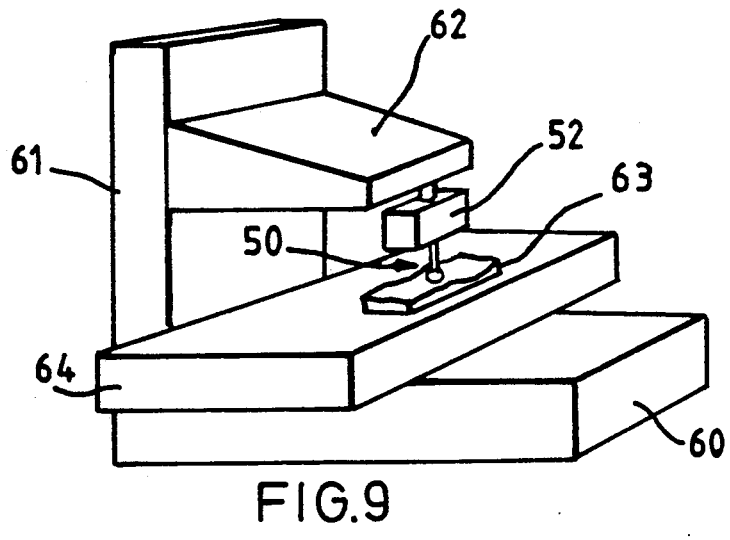
FIG. 9 diagrammatically illustrates an object tracing system incorporating the FIG. 8 tracing head for use with a numerically controlled machine tool adapted to reproduce an object the contours of which are traced by the tracing system.

The apparatus shown in FIG. 8 may be employed as the so-called tracing head of an object tracing system for producing digitised machining instructions for controlling a numerically controlled machine tool, such as a milling machine, to machine a workpiece to produce a copy of the traced object. The tracing system shown in FIG. 9 comprises a fixed machine bed 60 having an upright stand 61 from which projects a spindle head 62 carrying a tracing head embodying the invention having a stylus 50 adapted to follow the contours of an object 63 located on a table 64 which is movable by an electronic controller (not shown) in the X and Y directions on the bed 60 in order to scan the stylus 50 over the object 63 in a predetermined pattern. The shank 51 of the tracing head is axially movable in the Z-direction with the spindle head 62 and the position of the shank is adjusted by the controller in response to the output signal of the tracing head as the stylus 50 is scanned over the object so as to maintain the stylus 50 slightly deflected from its neutral position and in contact with the surface of the object. The position of the table 64 and the spindle head 62 are monitored as the stylus 50 is scanned over the surface of the object 63 to produce a set of digitised co-ordinates representing points the surface profile of the article, which co-ordinates are recorded in a memory of the system or in a secondary memory device. The stored set of co-ordinates values obtained at the end of the scanning process can then be used to control the machine tool to machine a workpiece with a replica of the object.

What is claimed is:

1. A displacement following arrangement comprising:

first and second members, the first member having a datum position relative to the second member;

a displacement path along which the first member is guided for movement by the second member;

a positioning member having two ends and two opposite sides and mounted on one of the first and second members for rotation in a path about an axis of rotation intermediate the ends of the positioning member;

a pair of stops mounted on the other of the first and second members and extending into the path of rotation of the positioning member on the opposite sides of the positioning member; and resilient means adapted to bias the positioning member about its axis of rotation into engagement with the stops so as to bias the first member into the datum position from which the first member is bidirectionally displaceable along the displacement path against the action of said resilient means.

2. An arrangement according to claim 1, wherein the displacement path is linear.

3. An arrangement according to claim 1, wherein the stops are spaced apart along the displacement path.

4. An arrangement according to claim 1, wherein the positioning member comprises a beam and the axis of rotation of the beam is substantially at the midpoint of the beam.

5. An arrangement according to any one of the preceding claims, wherein the resilient means comprises a tension spring connected between the said one of the first and second members and a point on the positioning member between the axis of rotation and one said end of the postioning member.

6. A displacement measuring device comprising a displacement following arrangement according to claim 1 in combination with means for sensing displacement of the first member relative to the second member and for providing a measurement signal corresponding to the displacement of the first member from the datum position.

7. A device according to claim 6, wherein the sensing means comprises an electro-mechanical transducer for providing an electrical measurement signal corresponding to the displacement of the first member from the datum position.

8. A displacement measuring apparatus comprising first and second displacement measuring devices according to claim 6 or 7, the displacement paths of the first and second displacement measuring devices being non-parallel and the second member of the second device being fixed to the first member of the first device.

9. Apparatus according to claim 8, wherein the displacement paths of the first and second displacement measuring devices are linear.

10. Apparatus according to claim 9, wherein the displacement paths of the first and second displacement measuring devices are perpendicular to each other.

11. Apparatus according to claim 9, comprising a third displacement measuring device, the displacement paths of the first, second and third displacement measuring devices being mutually perpendicular and the second member of the third device being fixed to the first member of the second device.

12. A tracing system comprising displacement measuring apparatus according to claim 11, a table, a shank and a stylus, the second member of the first displacement measuring device being attached to the shank and the first member of the third displacement measuring device having attached thereto the stylus for contacting an object to be traced, which is mounted on the table of the tracing system, and for following the contours of the object upon relative movement of the shank and table.

* * * * *

UNITED STATES PATENT AND TRADEMARK OFFICE
CERTIFICATE OF CORRECTION

PATENT NO. : 5,101,572

DATED : April 7, 1992

INVENTOR(S) : Kam C. Kwong, Kam H. Kwong, and Ming Fai Lau

It is certified that error appears in the above-identified patent and that said Letters Patent is hereby corrected as shown below:

On the title page, Item

(73)    Assignee:    Kam Cheung Kwong; Hong Kong
                                 Kam Ho Kwong; Hong Kong
                                 Ming Fai Lau; Hong Kong Signed and Sealed this Twelfth Day of April, 1994

Attest:

BRUCE LEHMAN

Attesting Officer

Commissioner of Patents and Trademarks